US008364830B2

(12) United States Patent
Kimizuka et al.

(10) Patent No.: US 8,364,830 B2
(45) Date of Patent: Jan. 29, 2013

(54) CONNECTION CONTROL IN THIN CLIENT SYSTEM

(75) Inventors: Masahiko Kimizuka, Tokyo (JP); Kunihiro Koshiba, Tokyo (JP)

(73) Assignee: NEC Corporation, Tokyo (JP)

( * ) Notice: Subject to any disclaimer, the term of this patent is extended or adjusted under 35 U.S.C. 154(b) by 83 days.

(21) Appl. No.: 11/950,836

(22) Filed: Dec. 5, 2007

(65) Prior Publication Data

US 2008/0263217 A1    Oct. 23, 2008

(30) Foreign Application Priority Data

Dec. 5, 2006    (JP) .................................. 2006-328129

(51) Int. Cl.
*G06F 15/16* (2006.01)
(52) U.S. Cl. ........ 709/229; 709/217; 709/223; 709/226; 709/227
(58) Field of Classification Search .................. 709/217, 709/223, 226, 227, 229
See application file for complete search history.

(56) References Cited

U.S. PATENT DOCUMENTS

| 5,341,477 | A | 8/1994 | Pitkin et al. |
| 5,805,804 | A | 9/1998 | Laursen et al. |
| 6,317,775 | B1 | 11/2001 | Coile et al. |
| 6,324,177 | B1 | 11/2001 | Howes et al. |
| 6,961,772 | B1 | 11/2005 | Wensel |
| 7,478,387 | B2 | 1/2009 | Abelite et al. |
| 7,577,959 | B2 | 8/2009 | Nguyen et al. |
| 2002/0164983 | A1* | 11/2002 | Raviv et al. .................... 455/432 |
| 2002/0196782 | A1 | 12/2002 | Furukawa et al. |
| 2003/0204562 | A1 | 10/2003 | Hwang |
| 2004/0060048 | A1 | 3/2004 | Abelite et al. |

(Continued)

FOREIGN PATENT DOCUMENTS

| EP | 1 043 648 A2 | 10/2000 |
| JP | 8-263283 | 10/1996 |

(Continued)

OTHER PUBLICATIONS

N. Nakamura et al., "Service-Oriented Robust Processing Method on Autonomous System Management", Internet Research Laboratories, NEC Corporation, pp. 2-8E, vol. 104 (2004).

(Continued)

*Primary Examiner* — Yves Dalencourt
(74) *Attorney, Agent, or Firm* — Scully, Scott, Murphy & Presser, P.C.

(57) ABSTRACT

In a first exemplary aspect of the present invention, a thin client server system includes thin client servers, which comprises clients which are grouped into client groups based on client data; thin client terminals which are allocated with terminal data and are grouped into terminal groups based on the terminal data, wherein users are allocated with user identifiers and are grouped into user groups based on the user identifiers, and each of the client groups is predetermined for at least one of one of the terminal groups and one of the user groups, and a connection control server interposed between the thin client servers and the thin client terminals. The connection control server determines connectable client groups based on a specific user identifier of a specific user, and a specific terminal data of a specific one of the thin client terminals used by the specific user, determines a desired client of at least a desired one of the connectable client groups based on a status of each of the clients. The specific thin client terminal connects with the desired client based on the client data of the desired client.

12 Claims, 5 Drawing Sheets

U.S. PATENT DOCUMENTS

| | | | |
|---|---|---|---|
| 2004/0121299 A1 | 6/2004 | Rougeau et al. | |
| 2005/0108709 A1 | 5/2005 | Sciandra et al. | |
| 2005/0198239 A1 | 9/2005 | Hughes | |
| 2005/0220039 A1 | 10/2005 | Hoshino et al. | |
| 2005/0228853 A1* | 10/2005 | Yamamura et al. | 709/200 |
| 2005/0268328 A1 | 12/2005 | Corliano | |
| 2006/0031942 A1* | 2/2006 | Jones et al. | 726/27 |
| 2006/0174087 A1 | 8/2006 | Hashimoto et al. | |
| 2007/0073729 A1 | 3/2007 | Tsunehiro et al. | |
| 2007/0180448 A1 | 8/2007 | Low et al. | |
| 2007/0281689 A1* | 12/2007 | Altman et al. | 455/435.1 |
| 2008/0070495 A1* | 3/2008 | Stricklen et al. | 455/3.01 |
| 2008/0263217 A1 | 10/2008 | Kimizuka et al. | |

FOREIGN PATENT DOCUMENTS

| | | |
|---|---|---|
| JP | 2000-181821 | 6/2000 |
| JP | 2001-282737 | 10/2001 |
| JP | 2002-111713 | 4/2002 |
| JP | 2002-323986 A | 11/2002 |
| JP | 2003-85059 | 3/2003 |
| JP | 2003-296208 | 10/2003 |
| JP | 2005-100344 | 4/2005 |
| JP | 2005-339133 | 12/2005 |
| JP | 2006-23990 | 1/2006 |
| JP | 2006-134176 | 5/2006 |
| JP | 2006-166559 | 6/2006 |
| JP | 2007-94610 | 4/2007 |
| TW | 514814 | 12/2002 |
| WO | WO 01/55813 A2 | 8/2001 |
| WO | WO 01/63401 A2 | 8/2001 |
| WO | WO 01/63402 A2 | 8/2001 |

OTHER PUBLICATIONS

N. Morishige et al., "Operating System Trouble Handling Standard Management Tools are ineffective on Operating System Hang Ups Remote Monitoring Board Equipped With a Romote Restart", No. 23, pp. 108-111, Nikkei BP, Feb. 1, 1999.

United States Office Action dated Sep. 29, 2010 received in related U.S. Appl. No. 11/763,745.

Taiwanese Official Action dated Jul. 26, 2011 together with an English language translation from TW 096146049.

China Official Action dated Apr. 26, 2011 together with an English language translation from CN 200710111815.7 received in related U.S. Appl. No. 11/763,745, filed Jun. 15, 2007.

Japanese Official Action dated Mar. 2, 2011 together with a partial English language translation from JP 2006-166559 received in related U.S. Appl. No. 11/763,745, filed Jun. 15, 2007.

United States Office Action dated May 25, 2011 received in related U.S. Appl. No. 11/763,745.

Koji, Yamada, "Point of Thin Client System Design That Uses Citrix Presentation Server", N+I Network, Softbank Publishing Corp., Sep. 1, 2005, vol. 5, No. 9, pp. 26-30.

Japanese Official Action dated Apr. 27, 2012 from related application JP 2009-167936 together with an English language translation.

Chinese Official Action dated Jun. 1, 2012 from related application CN200710196477.1 together with an English language translation.

United States Office Action dated Nov. 7, 2011 received in related U.S. Appl. No. 11/763,745.

Taiwanese Official Action dated Mar. 19, 2012 together with an English language translation from TW 096121707.

* cited by examiner

Fig. 2

GROUP DATA MANAGEMENT TABLE 23

| CLIENT NAME | GROUP |
|---|---|
| CLIENT#1-1 | C-A |
| CLIENT#1-2 | C-B |
| CLIENT#2-1 | C-A |
| CLIENT#2-2 | C-B |
| ... | ... |

| THIN CLIENT TERMINAL NAME | GROUP |
|---|---|
| THIN CLIENT TERMINAL#1 | T-A |
| THIN CLIENT TERMINAL#2 | T-B |
| ... | ... |

| USER ID | GROUP |
|---|---|
| USER#1 | U-A |
| USER#2 | U-B |
| USER#3 | U-B |
| USER#4 | U-B |
| ... | ... |

Fig. 3

CONNECTION DESTINATION SETTING DATA TABLE (24)

| CLIENT GROUP | USER GROUP | THIN CLIENT TERMINAL GROUP |
|---|---|---|
| C-A | U-A | T-A, T-B |
| C-B | U-B | T-B |
| C-C | U-A | — |
| C-D | — | T-A |
| ⋮ | ⋮ | ⋮ |

Fig. 4

CLIENT STATUS MANAGEMENT TABLE (25)

| CLIENT | STATUS | USER | THIN CLIENT TERMINAL |
|---|---|---|---|
| CLIENT#1-1 | POWER ON | — | — |
| CLIENT#1-2 | LOG ON | USER#1 | THIN CLIENT TERMINAL#1 |
| CLIENT#2-1 | POWER OFF | — | — |
| ⋮ | ⋮ | ⋮ | ⋮ |

# CONNECTION CONTROL IN THIN CLIENT SYSTEM

TECHNICAL FIELD

The present invention relates to a connection control method in a thin client system using thin client terminals and a thin client server, and to a connection control server for the same. This Us patent application is based on Japanese Patent application No. 2006-328129. The disclosure of the Japanese Patent application No. 2006-328129 is incorporated herein by reference.

BACKGROUND ART

In a system having a client server, a computer having a magnetic disk unit and the like is used as a client terminal. However, due to complicated business processes, recently, one user uses a plurality of computers and one computer is used for the business processes. As a result, along with complicating of software for the client terminal, management cost of the client terminal increases. Furthermore, a probability of data leakage becomes high because the client terminal includes a storage unit such as a magnetic disk unit. In this way, a system has been changing to combine terminals with a server. Such a terminal is diskless (which has no storage device such as the magnetic disk unit) or a write operation to the disk is forbidden (hereinafter, to be referred to as a thin client terminal), and the server stores data and executes an operating system (OS) and business applications (hereinafter, to be referred to as a thin client sever). In Japanese Patent Application No JP2006-16559, the applicant of the present patent application already proposed a session management method which allows the operating system on the thin client server side to be booted up and shut down by the thin client terminal.

The thin client server executes business applications that have been executed by the client terminals in the conventional system having a client server. Accordingly, the thin client server includes a client as an executing section (execution image) for every thin client terminal. An operating system, business applications, and data are installed for every connection from the thin client terminal. Since the thin client server generally manages a plurality of the thin client terminals, a plurality of clients operate on the same thin client server.

In such a thin client system, a user connects the thin client terminal with the client in the thin client server, and makes the client to execute the business application. The user supplies data and commands required for execution of the business application via the thin client terminal, and confirms the execution result of the business application on a monitor of the thin client terminal.

In this thin client system, as well as an authentication of the user using the thin client terminal, the connection management of the thin client terminal to the thin client server is implemented by using individuals such as the user and the thin client terminal as a key (for example, see Japanese Patent Application No. 2006-166559). When such a connection control method is employed, it is required to allocate one or more clients on the thin client server to one user and it is difficult to allocate a single client to a plurality of users or to share the single client by the users. In addition, when a failure occur in the thin client server, the thin client terminal which has been connected to one client on the thin client server cannot be connected with the thin client server until the server returns to a normal condition, resulting in suspension of a user business.

Unlike the conventional system with the client server, the client cannot be rebooted up at an optional timing by the user in the thin client system. As a result, the user cannot implement operations such as application of security patch for the business applications and software update, which require rebooting up of the client. Thus, a system administrator has a heavy burden because the system administrator must implement these operations.

In a conventional session management method between the thin client terminals and the thin client server, the management becomes complicated since connection definition of M×N combinations is required in an environment that M clients in a thin client server are shared by N persons. In addition, since there is no way by that the user can preliminarily know which client is in an unused state in actual operational situation, the user is required to search the unused client by sequentially testing the client when the user connects the thin client terminal to the thin client server. Furthermore, when an in-use client becomes out of control, the user must reboot up the client terminal after contacting the administrator and identifying the in-use client through checking logs by the administrator.

DISCLOSURE OF INVENTION

The present invention provides a connection control method and a connection control server in a thin client system, in which a plurality of users can share a plurality of clients, and only a specific client can be safely rebooted up even when a fault has occurred.

In a first exemplary aspect of the present invention, a thin client server system includes thin client servers, which comprises clients which are grouped into client groups based on client data; thin client terminals which are allocated with terminal data and are grouped into terminal groups based on the terminal data, wherein users are allocated with user identifiers and are grouped into user groups based on the user identifiers, and each of the client groups is predetermined for at least one of one of the terminal groups and one of the user groups, and a connection control server interposed between the thin client servers and the thin client terminals. The connection control server determines connectable client groups based on a specific user identifier of a specific user, and a specific terminal data of a specific one of the thin client terminals used by the specific user, determines a desired client of at least a desired one of the connectable client groups based on a status of each of the clients. The specific thin client terminal connects with the desired client based on the client data of the desired client.

In a second exemplary aspect of the present invention, a connection control method is achieved by transmitting a specific terminal data of a specific thin client terminal and a specific user identifier of a specific user from the specific thin client terminal to a connection control server; wherein thin client terminals are allocated with terminal data and are grouped into terminal groups based on the terminal data, users are allocated with user identifiers and are grouped into user groups based on the user identifiers, and thin client servers, which comprises clients which are grouped into client groups based on client data; wherein each of the client groups is predetermined for at least one of one of the terminal groups and one of the user groups; by determining connectable client groups based on the specific user identifier and the specific terminal data; by determining a desired client of at least a desired one of the connectable client groups based on a status of each of the clients; and by connecting the specific thin client terminal with the desired client based on the client data of the desired client.

In a third exemplary aspect of the present invention, a computer-readable storage medium which stores a program for realizing of a connection control method which is achieved by providing terminal groups obtained by grouping thin client terminals based on terminal data allocated to the thin client terminals, user groups obtained by grouping users to which user identifiers are allocated, and client groups obtained by grouping clients of client servers based on client data; by providing each of the client groups is predetermined for at least one of one of the terminal groups and one of the user groups; by determining connectable client groups based on the specific user identifier and the specific terminal data; and by determining a desired client of at least a desired one of the connectable client groups based on a status of each of the clients, such that the specific thin client terminal is connected with the desired client based on the client data of the desired client.

BRIEF DESCRIPTION OF DRAWINGS

The above and other objects, advantages and features of the present invention will be more apparent from the following description of certain embodiments taken in conjunction with the accompanying drawings, in which.

EXEMPLARY EMBODIMENTS

Hereinafter, a thin client system according to exemplary embodiments of the present invention will be described in detail with reference to the attached drawings.

Figure 1:
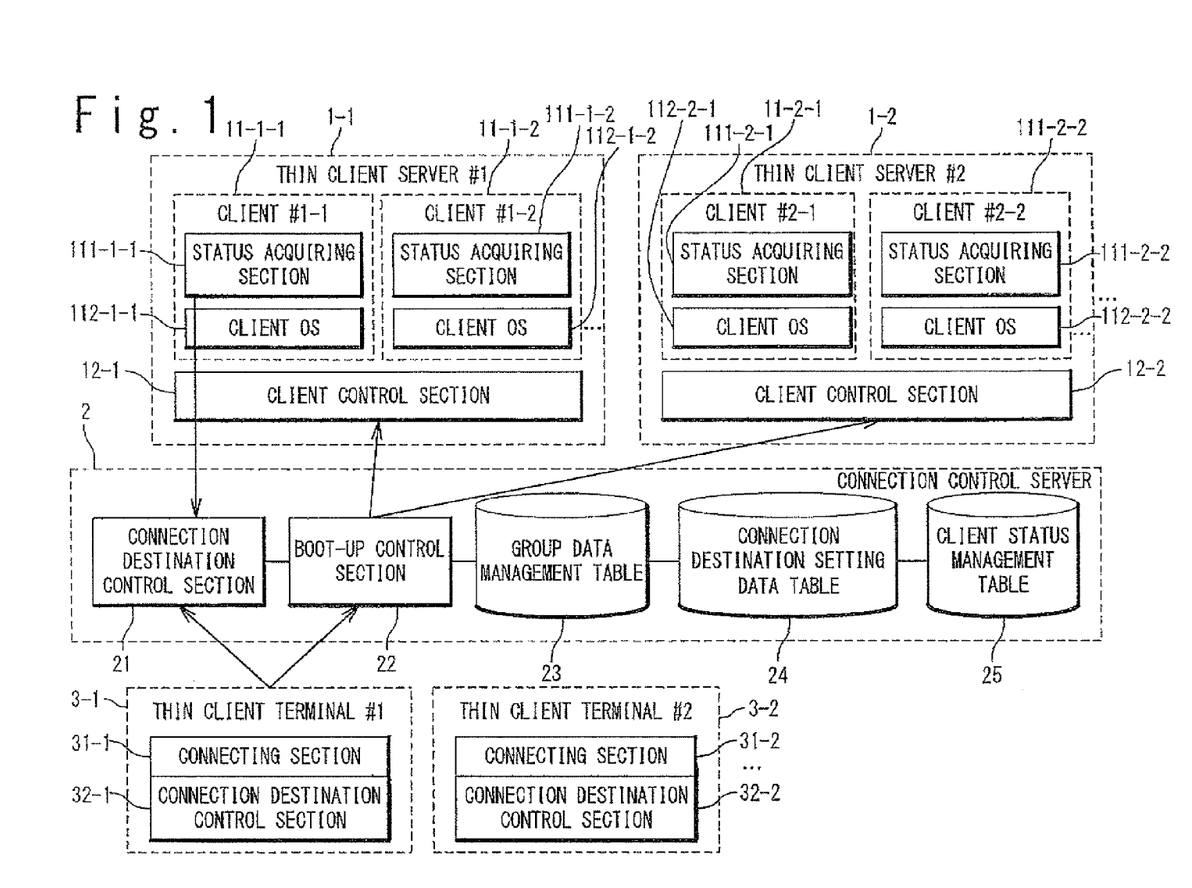
FIG. 1 is a block diagram showing an example of a configuration of a thin client system for which a connection control method of an exemplary embodiment of the present invention is applied.

FIG. 1 is a block diagram showing a configuration of the thin client system according to an exemplary embodiment of the present invention which performs a connection control method. Referring to FIG. 1, the thin client system includes n (n is an integer more than 1) thin client servers $1-i$ ($i=1, 2, \ldots, n$), thin client terminals $3-j$ ($j=1, 2, \ldots$), and a connection control server 2. The connection control server 2 is provided in a network to control a connection between the thin client terminal $3-j$ and a client on the thin client server $1-i$.

Each of the thin client servers $1-i$ includes clients $11-i-k$ ($k=1, 2, \ldots$) as program execution sections (execution images) corresponding to the thin client terminals, and a client control section $12-i$. The client control section $12-i$ is provided for the clients $11-i-k$ in the thin client server $1-i$ in common to perform boot-up and reboot-up processes of each of the clients $11-i-k$. As described above, although an operating system (client OS), business applications, and data allocated to every connection from the thin client terminal are installed in each of the clients $11-i-k$, the client $11-i-k$ includes a status acquiring section $111-i-k$. The status acquiring section $111-i-k$ has a function of transmitting a status of the clients $11-i-k$ such as power-on, power-off, log-off, log-on, and the like to a connection destination control section 21 of the connection control server 2, when detecting the change of the status of the client $11-i-k$.

The connection control server 2 includes the connection destination control section 21, a boot-up control section 22, a group data management table 23, a connection destination setting data table 24, and a client status management table 25. The connection destination control section 21 has a function of determining a client $11-i-k$ to be connected to the thin client terminal $3-j$. Also, the connection destination control section 21 transmits a client data of a selected client to the boot-up control section 22 and issues an instruction to the boot-up control section 22, when the client is booted up or rebooted up in response to a request from the thin client terminal $3-j$. The boot-up control section 22 has a function of receiving requests (instructions) from the thin client terminals $3-j$ and the connection destination control section 21, and transferring each of the received requests to the client control section $12-i$ of the thin client server $1-i$ so that the client control section $12-i$ boots or reboots up the client $11-i-k$.

Figure 2:
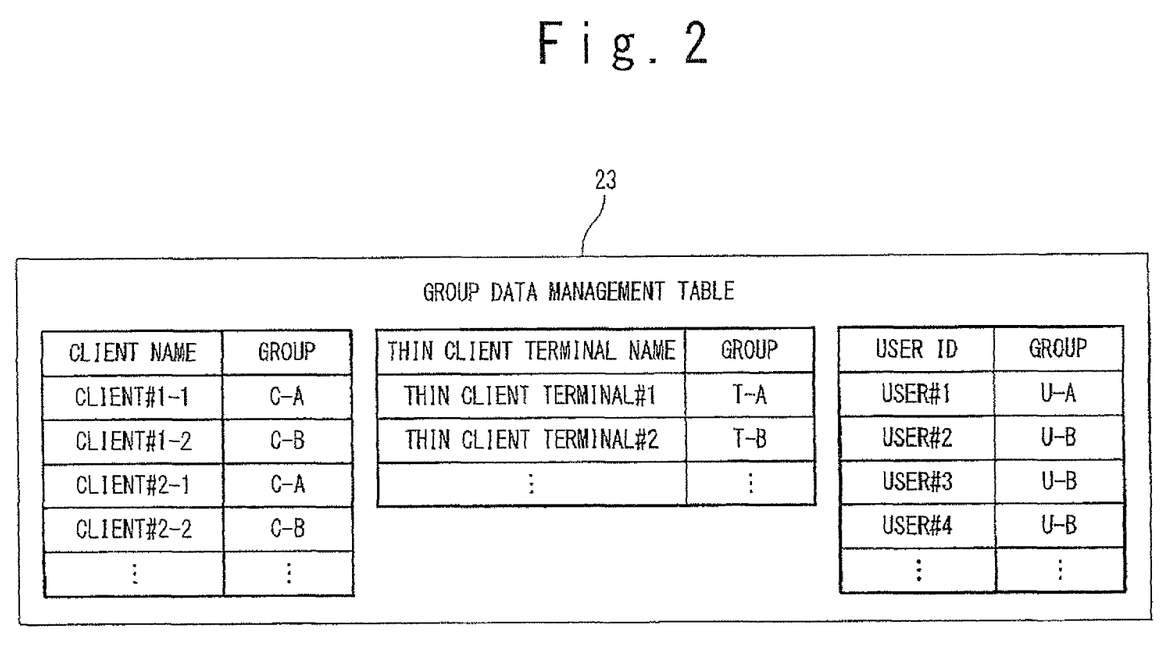
FIG. 2 is a diagram showing an example of a configuration of a group data management table.
Figure 3:
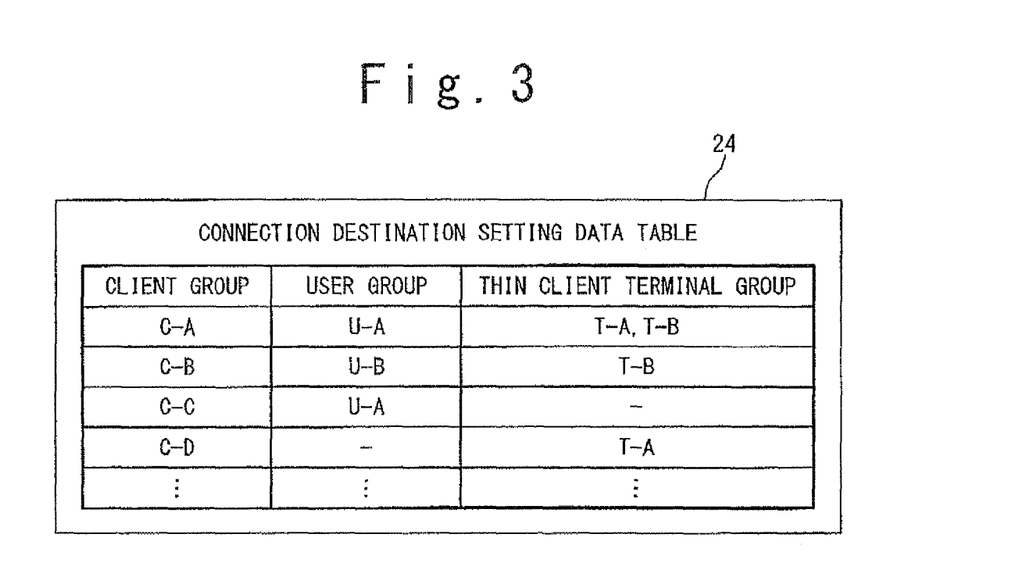
FIG. 3 is a diagram showing an example of a configuration of a connection destination setting data table.
Figure 4:
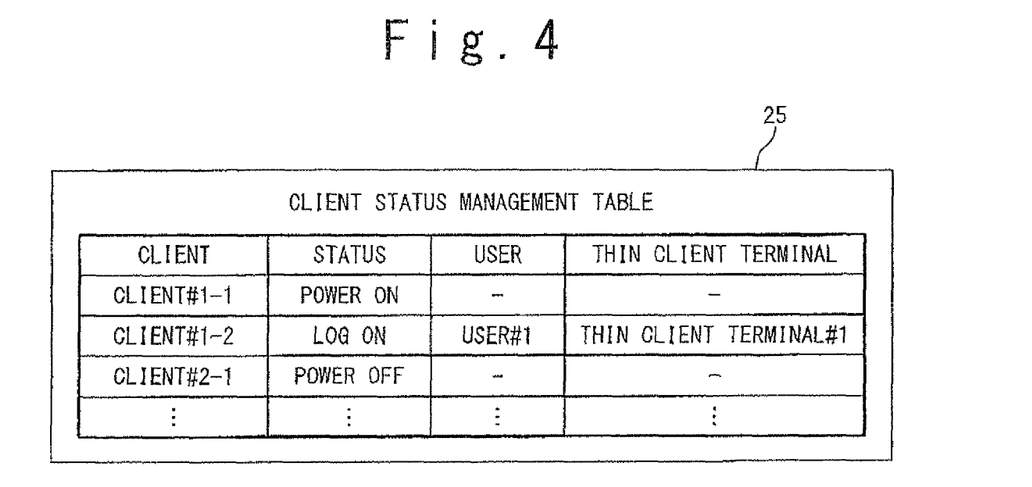
FIG. 4 is a diagram showing an example of a configuration of a client status management table.

Data necessary for the connection destination control section 21 to perform the connection control are stored in the group data management table 23, the connection destination setting data table 24, and the client status management table 25. As shown in FIG. 2, data indicating which of user groups one user (user ID) belongs to, data indicating which of thin client terminal groups one thin client terminal belongs to, and data indicating which of client groups one client identifier belongs to are stored in the group data management table 23. As shown in FIG. 3, data indicating which of the client groups the user (user ID) group and/or the thin client terminal group can be connected to are stored in the connection destination setting data table 24. As shown in FIG. 4, data indicating the status of the clients 11 is stored for every client in the client status management table 25. Data of the group data management table 23 and the connection destination setting data table 24 need to be prepared before booting up of the operation of this thin client system (before connection to the clients 11 by the user).

The thin client terminal $3-j$ includes a connecting section $31-j$ and a connection destination control section $32-j$. The connection destination control section $32-j$ acquires a user ID data inputted from the user on the thin client terminal $3-j$, transmits the user ID data and a data indicating a thin client terminal to the connection destination control section 21 of the connection control server 2, and then obtains a data of connectable client from the connection destination control section 21. Also, the connection destination control section $32-j$ transmits the connectable client data to the connecting section $31-j$. The connecting section $31-j$ establishes a connection to the client $11-i-k$ by using the connectable client data.

Next, an operation of the thin client system according to the exemplary embodiment of the present invention will be described in detail.

Figure 5:
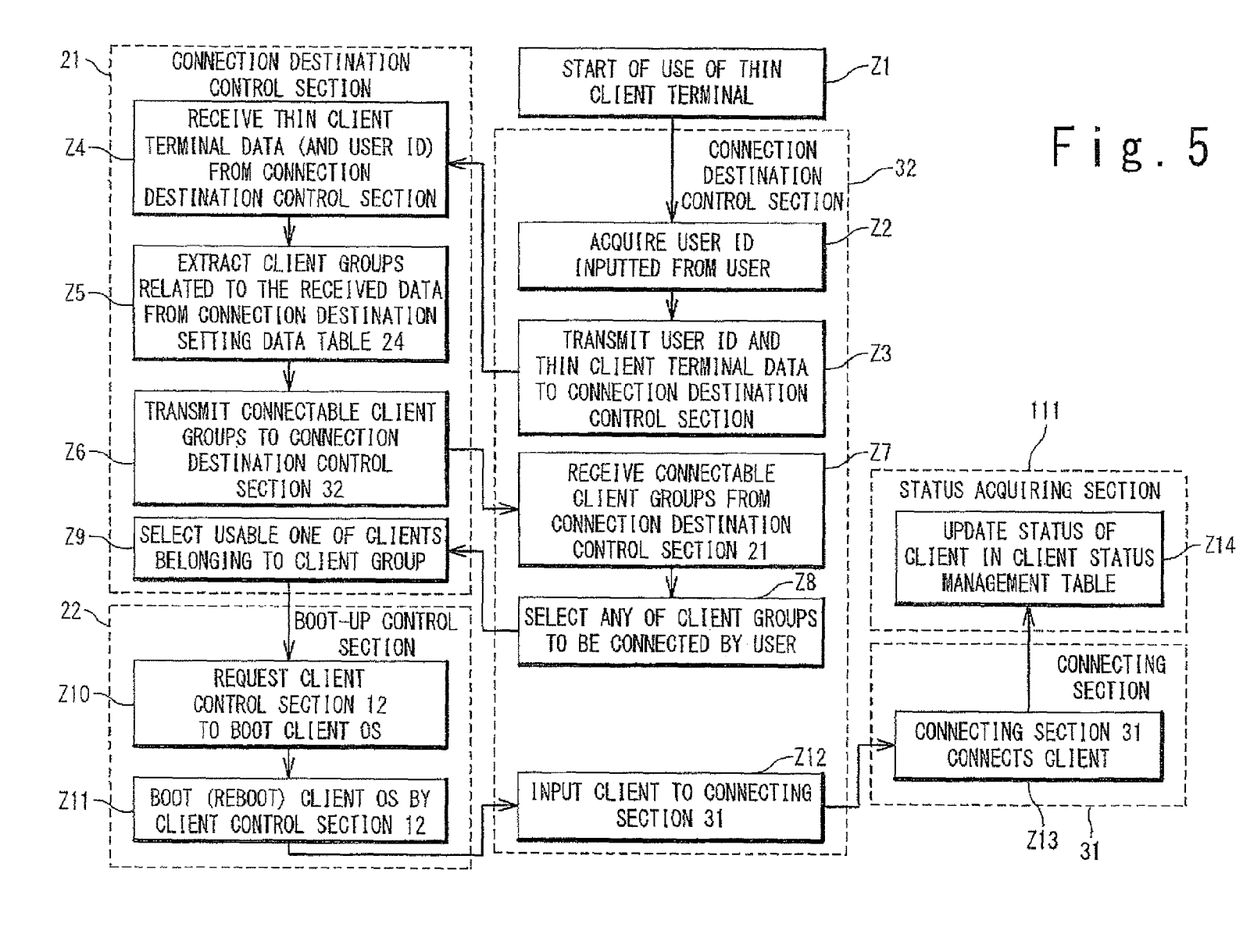
FIG. 5 is a flow chart showing a procedure of connection management from a thin client terminal to a thin client server.

Firstly, referring to FIG. 5, a procedure of a connection control when a connection is established from the thin client terminal $3-j$ to the thin client server $1-i$ will be described.

When the user tries to establish a connection from the thin client terminal $3-j$ to the client $11-i-k$, usage of the thin client terminal $3-j$ is started (step Z1). At this time, the user inputs a user ID data into the thin client terminal $3-j$, and the connection destination control section $32-j$ acquires the user ID data (step Z2), and then transmits the user ID data to the connection destination control section 21 of the connection control server 2 as well as the thin client terminal data (step Z3). The connection destination control section 21 receives the user ID data and the thin client terminal data (step Z4), and retrieves a user group and a thin client terminal group from the group data management table 23 based on the user ID data and the thin client terminal data, respectively. Then, the connection destination control section 21 retrieves client groups from the connection destination setting data table 24 based on each and both of the user group and the thin client terminal group (step Z5). That is to say, at the step Z5, the connection destination control section 21 retrieves connectable client groups for the user group and the thin client terminal group.

Assuming that the connection destination control section 21 receives "user #1" as the user ID data and "thin client terminal #1" as the thin client terminal data, the retrieving or extracting step at the step Z5 will be described. In this case, the connection destination control section 21 refers to the group data management table 23. The "user #1" belongs to a group "U-A", and the "thin client terminal #1" belongs to a group "T-A". Further, the connection destination control section 21 refers to the connection destination setting data table 24. The client group identifier "C-A" is retrieved for a combination of the user group "U-A" and the thin client terminal group "T-A". Since it is permitted that each of the user group and the thin client terminal group is optional, the client groups are also retrieved. As a result, the connection destination control section 21 retrieves the client groups "C-A", "C-C" and "C-D" as the connectable client groups from the connection destination setting data table 24. In an example shown in FIG. 3, the user ID data "U-A" and the thin client terminal data "T-A" are respectively allocated to the client groups "C-C" and "C-D" in the connection destination setting data table 24. This means that, in case of the client group "C-C", a connection from any thin client terminal can be made if the user ID data belongs to the "U-A", and that, in case of the client group "C-D", a connection from any user can be made if the thin client terminal group belongs to the "T-A".

The data of the connectable client groups are transmitted from the connection destination control section 21 to the connection destination control section 32-j of the thin client terminal 3-j (step Z6). The connection destination control section 32-j of the thin client terminal 3-j receives the connectable client group data (step Z7), and the connectable client group data are displayed on a screen. At that time, the user selects a desired client group from among the connectable client groups (step Z8). As a result, the connection destination control section 32-j transmits a data of the selected client group to the connection destination control section 21.

The connection destination control section 21 receives the selected client group data and searches the client status management table 25 based on each of the clients of the selected client group to select a usable client 11-i-k. That is, the connection destination control section 21 selects one of the clients of the selected group to which no user logons (step Z9). When a status of the selected client indicates a connection impossible status such as a status of power-off, the connection destination control section 21 issues a request to the boot-up control section 22 (step Z10). The boot-up control section 22 controls the client control section 12-i of the thin client server 1-i to boot up the client 11-i-k (or to reboot up it, depending on a status of the client 11-i-k) in response to the request (step Z11). The connection destination control section 21 transmits a data of the client 11-i-k booted up/rebooted up to the connection destination control section 32-j in the thin client terminal 3-j. When it is not needed to boot up or reboot up the client 11-i-k, the control flow directly advances from the step Z9 to the following step Z12.

As described above, the connection destination control section 32-j receives and supplies the client data to the connecting section 31-j of the thin client terminal 3-j (step Z12). As a result, the connecting section 31 connects to the client 11-i (step Z13), and the status acquiring section 111-i on the client 11-i controls the connection destination control section 21 to update the status of the client 11-j on the client status management table 25 (step Z14).

As described above, the thin client terminal 3-j is connected to the client 11-i. Here, an operation by the user for selecting and connecting the client includes only inputting of the user ID data and selecting of the client group, and all of other operations are automatically processed. Therefore, the user is not requested to search the unused client by testing the client in turn.

Figure 6:
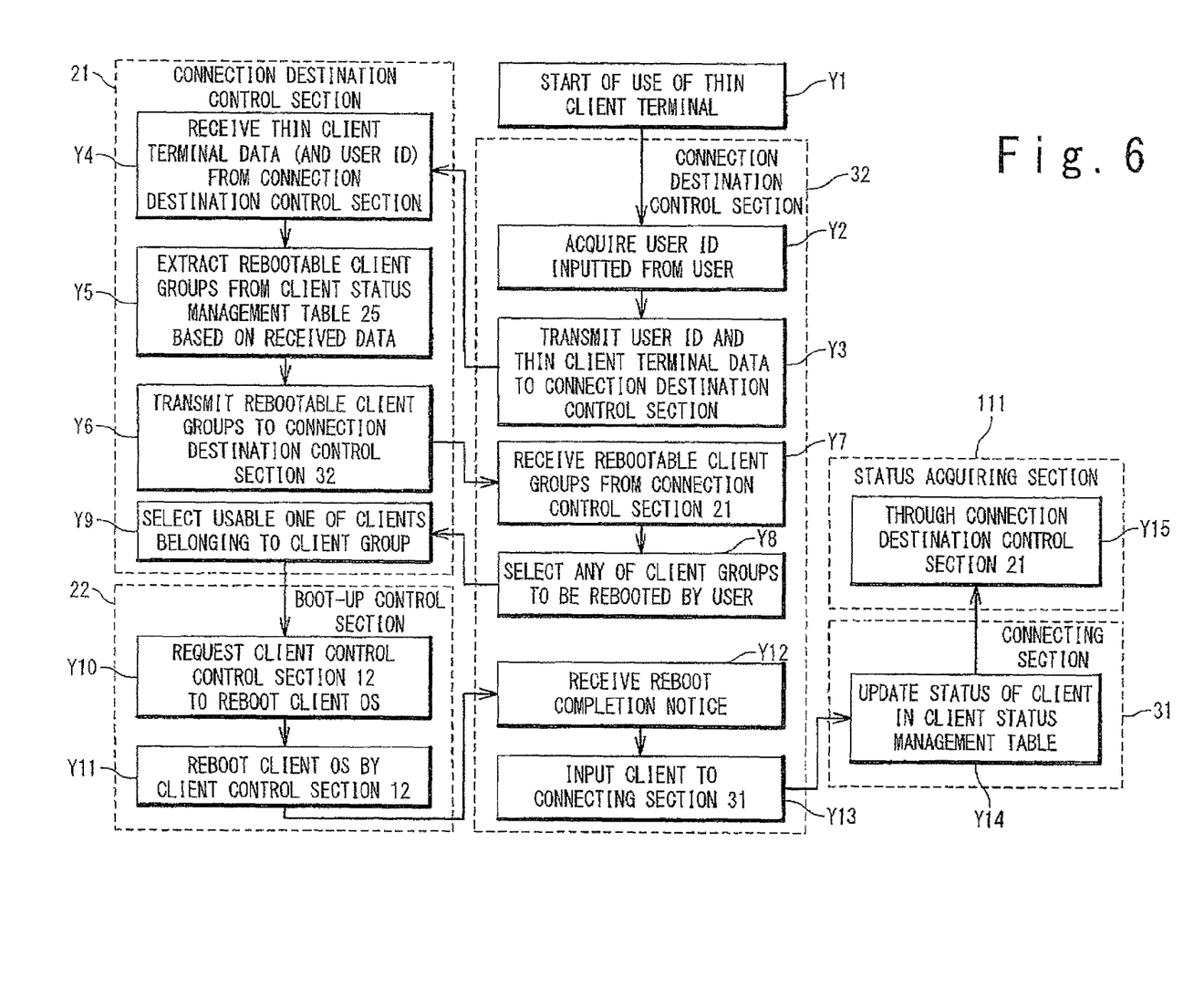
FIG. 6 is a flow chart showing a procedure for rebooting up a client.

Next, referring to FIG. 6, a process when the client 11 is rebooted up through the thin client terminals 3 will be described.

When the client 11-i-k is rebooted up, the connection destination control section 32-j of the thin client terminals 3-j is required to be booted up in a mode for rebooting up different from a mode for the connection to the client 11.

When the user tries to reboot up the client 11-i-k by using the thin client terminals 3-j, the thin client terminals 3-j is started (step Y1). Here, the user inputs the user ID data into the connection destination control section 32-j (step Y2), and the connection destination control section 32-j transmits the user ID data to the connection destination control section 21 of the connection control server 2 in addition to a data of the thin client terminals 3-j used by the user (thin client terminal data) (step Y3). The connection destination control section 21 receives the user ID data and the thin client terminal data (step Y4), and retrieves rebootable client groups from the client status management table 25 based on the user ID data and the thin client terminal data (step Y5). That is to say, the connection destination control section 21 retrieves the client groups to which the clients in a connection state currently by the user belong. Here, a condition, "the rebootable client group", means that the client 11-i-k already connected by the user exists in the client group.

Assuming that the connection destination control section 21 receives a "user #1" as the user ID data and a "thin client terminal #1" as the thin client terminal data, a retrieving step at the step Y5 will be described. In this case, the connection destination control section 21 refers to the client status management table 25. For example, the clients 11-i-k has been connected based on the "user #1" and the "thin client terminal #1" and can be confirmed as a "client terminal #1-2". Also, when the connection destination control section 21 refers to the group data management table 23, the "thin client terminal #1-2" belongs to a group "C-B", and the client group data transmitted to the connection destination control section 32-j in this case shows the group "C-B". For example, if the connection destination control section 21 receives data of "user #2" and the "thin client terminal #1", the client group data transmitted to the connection destination control section 32-j is data showing "nothing" since it can be found from the client status management table 25 that there is no rebootable client.

The data of rebootable client groups is transmitted from the connection destination control section 21 to the connection destination control section 32-j of the thin client terminal 3-j (step Y6). In response to this, the rebootable client group data is received by the connection destination control section 32-j in the thin client terminal 3-*j* (step Y7), and the rebootedable client group data is displayed on a screen. At this time, the user selects the client group to be rebooted from among the rebootable client groups by using the thin client terminals 3-*j* (step Y8). As a result, the connection destination control section 32-*j* transmits data regarding the selected client group to the connection destination control section 21.

The connection destination control section 21 receives the selected client group data, selects the rebootable client 11-*i*-*k* from among the clients 11-*i*-*k* belonging to the client group selected by the user, and transmits the data of the selected client 11-*i*-*k* to the boot-up control section 22 (step Y9). Here, the selected client is already connected by the user.

Next, the boot-up control section 22 requests the client control section 12 to reboot up the client 11-*i*-*k* notified from the connection destination control section 21 (step Y10). The client control section 12 reboots up the client 11-*i*-*k* (step Y11). When the reboot-up is completed, the connection destination control section 32-*j* receives a reboot completion notice from the boot-up control section 22 (step Y12), and the connection destination control section 32-*j* supplies data of the rebooted up client into the connecting section 31 (step Y13). As a result, the connecting section 31 is connected to the client 11-*i*-*k* (step Y14), and the status acquiring section 111 on the corresponding client 11 updates a status of the client 11 in the client status management table 25 via the connection destination control section 21 (step Y15).

As described above, the user can reboot the client 11-*i*-*k* via the thin client terminals 3-*j*. Here, an operation to be performed by the user for rebooting the client includes only inputting the user data (user ID) and selecting the client group to be rebooted, and all of other operations are automatically processed. Therefore, even when the client in use is out of control, the user can reboot up the client without communicating with a system administrator.

In the above thin client system of the exemplary embodiment of the present invention, the group data management table 23, the connection destination setting data table 24, and the client status management table 25 are previously provided for the connection control server. Therefore, environment configuration and operation thereof when a plurality of the users share a plurality of clients can be greatly improved.

In the thin client system described above, the thin client servers 1 and the connection control server 2 may be realized by reading and executing programs by computers, respectively. Such programs are read into the computers from storage mediums such as a CD-ROM or a magnetic tape or via a network.

In the above description, one client group is selected by a user and one client is automatically selected from the selected client group. However, a plurality of client groups may be selected by the user and a plurality of clients may be booted up. In such a case, the plurality of clients may be rebooted up. Also, the connection destination control section 21 may check whether the client corresponding to the terminal data and the user ID data is already booted up, before retrieving the connectable client groups.

In the thin client system of the present invention, the resource of the thin client system can be utilized flexibly, since group data such as a user group, a terminal group, and a client group on the thin client server are employed as a key for a condition for connecting the client on the thin client server. Also, a plurality of the users can share the clients on one thin client server in time-sharing manner. Therefore, when a connection failure to the client on the thin client server has occurred, the connection destination control section 21 receives the notice of connection failure and automatically selects another connectable client of the same client group as a group to which the failed client belongs by referring to the client status management table 25 and controls the boot-up control section 22 and the connection destination control section 32-*j* such that the other connectable client is booted and the booted client is connected to the terminal. Thus, the user can avoid impossibility of carrying out a task. In addition, since the user can reboot up the client on the thin client server at an arbitrary timing, there are more chances to be dealt with by only the user without the administrator's help when the user have to apply a security patch and update software, and a client OS is frozen, so that reboot-up of the client on the thin client server is required.

As described above, according to the present invention, resources of the thin client system can be efficiently utilized compared to a conventional method. Also, according to the present invention, a load on an administrator of the thin client system can be reduced.

In this way, a connection control method is achieved in a thin client system including a thin client terminal and a client server which is connected to the thin client terminal and has a client executing an application program. Specifically, the thin client terminal receives an identifier of a user who connects the thin client terminal with the client, and transmits the user identifier and a thin client terminal data to a connection control server. A connection destination control section of the connection control server retrieves a data of client groups which is connectable, from a connection destination setting data table based on the user identifier and the thin client terminal data and returns the retrieval result to the thin client terminal. The thin client terminal transmits a data of one of the client groups which is selected by the user based on the retrieval result to the connection control server. The connection destination control section retrieves an available client from a client status management table based on the data of the selected client group, and transmits a data of the available client to the thin client terminal. The thin client terminal performing connection with the available client based on the data of the available client.

Also, a connection control method is achieved in a thin client system including a thin client terminal and a client server which is connected to the thin client terminal and has a client executing an application program. The thin client terminal receives an identifier of a user who reboots the client, and transmits the user identifier and a thin client terminal data to a connection control server. A connection destination control section of the connection control server retrieves data of client groups which is rebootable, from a client status management table based on the user identifier and the thin client terminal data and returns the retrieval result to the thin client terminal. The thin client terminal transmits a data of one of the client groups which is selected by the user based on the retrieval result to the connection control server. The connection destination control section transmits the data of the selected client group to a boot-up control section of the connection control server. The boot-up control section specifies a client being currently connected with the thin client terminal from the selected client group data, and requests a reboot-up of the client to the thin client server which contains the specified client.

In this case, the clients, the thin client terminals and the users are grouped and the grouping results are stored in a group data management table. The connection destination control section refers to the group data management table to determine the group data, and searches the group data management table for the determined result.

Also, a connection control server used in a thin client system includes a thin client terminal and a client server which is connected to the thin client terminal and has a client executing an application program. In the connection control server, a group data management table stores results of previously grouping for each of clients, thin client terminals and users. A connection destination setting data table shows the group of the clients corresponding to a combination of one group of thin client terminals group and one group of the users. A client status management table stores a state of each of the clients. A connection destination control section searches the group data management table and the connection destination setting data table based on a user identifier and a thin client terminal data which are received from the thin client terminal, returns the search result to the thin client terminal, searches the client status management table for a usable client based on data of a selected group of clients from the thin client terminal, and replies data of the searched client to the thin client terminal.

In this case, the connection control server may further include a boot-up control section configured to request the thin client server having the clients to boot up or reboot up the searched client.

Also, a connection control server is used in a thin client system includes a thin client terminal and a client server which is connected to the thin client terminal and has a client executing an application program. In the connection control server, a group data management table stores results of previously grouping for each of clients, thin client terminals and users. A client status management table stores a state of each of the clients. A boot-up control section requests the thin client server having the clients to reboot up the client. A connection destination control section searches the client status management table for a rebootable client based on a user identifier and a thin client terminal data which are received from the thin client terminal, returns the search result to the thin client terminal, specifies the rebootable client based on data of a selected group of clients from the thin client terminal, and controls the boot-up control section to reboot up the specified client.

Although the present invention has been described above in connection with several exemplary embodiments thereof, it will be appreciated by those skilled in the art that those exemplary embodiments are provided solely for illustrating the present invention, and should not be relied upon to construe the appended claims in a limiting sense.

What is claimed is:

1. A thin client server system comprising:
   thin client servers which comprise one or more execution sections which are grouped into execution-section groups based on client data, said execution sections being at least one of executable software and data;
   thin client terminals which are allocated with terminal data and are grouped into terminal groups based on the terminal data, wherein users are allocated with user identifiers and are grouped into user groups based on the user identifiers, and each of the execution-section groups is predetermined for at least one of: one of said terminal groups and one of the user groups;
   a connection control server interposed between said thin client servers and said thin client terminals, said connection control server determining connectable execution-section groups based on a user group identifier to which a specific user belongs and a terminal group for a specific thin client terminal used by the specific user, and selecting one of the connectable execution-section groups in response to an instruction from the specific thin client terminal;
   said connection control server comprises:
   a storage section configured to store a group data management table and a connection destination setting data table, wherein said group data management table stores the execution-section groups for the execution sections, the terminal groups for said thin client terminals, and the user groups for the users, and said connection destination setting data table stores each of the connectable execution-section groups for at least one of one of the terminal groups and one of the user groups; and
   a connection destination control section configured to determine the connectable execution-section groups from said group data management table and said connection destination setting data table based on at least one of the specific user identifier and the specific terminal data, to transmit the connectable execution-section groups to said specific thin client terminal, and to receive and determine a chosen execution-section group; and
   a client status management table storing a status of each of the execution-sections, said client status management table used by said connection control server to determine a usable execution section of the selected connectable execution-section group based on the status of each of the execution-sections in the selected connectable execution-section group, wherein status in the client management table of the usable execution-section is not log on, and
   wherein said specific thin client terminal connects with the usable execution section based on the client data of the usable execution section.

2. The thin client server system according to claim 1, wherein each of said thin client servers comprises a status acquiring section configured to transmit a data indicating a change of the status of each of the execution sections of said thin client server, and said connection destination control section further receives the status change data from each of said thin client servers and updates said client status management table based on the received status change data.

3. The thin client server system according to claim 1, wherein said connection destination control section further boots up the usable execution section and transmitting the client data of the usable execution section to said specific thin client terminal, and said specific thin client terminal connects to the usable execution section based on the client data of the usable execution section.

4. The thin client server system according to claim 1, wherein said connection destination control section further reboots up the usable execution section and transmitting the client data of the usable execution section to said specific thin client terminal, and said specific thin client terminal connects to the usable execution section based on the client data of the usable execution section.

5. A connection control method comprising:
   transmitting a specific terminal data of a specific thin client terminal and a specific user identifier of a specific user from said specific thin client terminal to a connection control server,
   wherein thin client terminals are allocated with terminal data and are grouped into terminal groups based on the terminal data, users are allocated with user identifiers and are grouped into user groups based on the user identifiers, and thin client servers comprising one or more execution sections grouped into execution-section groups based on client data, said execution sections being at least one of executable software and data, and each of the execution-section groups is predetermined for at least one of: one of said terminal groups and one of the user groups;

determining connectable execution-section groups based on a specific user group to which a specific user belongs and the terminal group for a specific thin client terminal used by the specific user;

determining a chosen one of the connectable execution-section groups in response to an instruction from the specific thin client terminal;

providing a client status management table which stores a status of each of the execution sections; and providing a group data management table and a connection destination setting data table, wherein said group data management table stores the execution-section groups for the execution sections, the terminal groups for said thin client terminals, and the user groups for the users, and said connection destination setting data table stores each of the connectable execution-section groups for at least one of one of the terminal groups and one of the user groups, wherein said determining the chosen one of the connectable execution-section groups comprises:

referring to said client status management table to determine a usable execution section of the chosen one of the connectable execution-section groups based on the status of each of the execution sections of the chosen one of the connectable execution-section groups, wherein the status in the client status management table of said usable execution section is not log on; and connecting said specific thin client terminal with the usable execution section based on the client data of the usable execution section, and said determining connectable execution-section groups comprises:

determining the connectable execution-section groups from said group data management table and said connection destination setting data table based on at least one of the specific user identifier and the specific terminal data;

transmitting the connectable execution-section groups to said specific thin client terminal; and determining the chosen execution-section group through a selection by said specific user.

6. The connection control method according to claim 5, further comprising:

transmitting a data indicating a change of the status of each of the execution sections of said thin client servers to said connection control server;

updating said client status management table based on the status change data.

7. The connection control method according to claim 5, further comprising:

booting up the usable execution section based on the client data of the usable execution section;

transmitting the client data of the usable execution section to said specific thin client terminal; and connecting said specific thin client terminal to the usable execution section.

8. The connection control method according to claim 5, further comprising:

rebooting up the usable execution sectionc4ient based on the client data of the usable execution section;

transmitting the client data of the usable execution section to said specific thin client terminal; and connecting said specific thin client terminal to the usable execution section.

9. A computer-readable storage medium which stores a program for realizing of a connection control method comprising:

providing terminal groups obtained by grouping thin client terminals based on terminal data allocated to the thin client terminals, user groups obtained by grouping users to which user identifiers are allocated, and execution-section groups obtained by grouping execution sections of client servers based on client data, said execution sections being at least one of executable software and data;

providing each of the execution-section groups is predetermined for at least one of: one of said terminal groups and one of the user groups;

providing a client status management table which stores a status of each of the execution sections;

determining connectable execution-section groups based on the specific user group to which a specific user belongs and the terminal group for a specific thin client terminal used by the specific user;

determining a chosen one of the connectable execution-section groups in response to an instruction from the specific thin client terminal, such that said specific thin client terminal is connected with a usable execution section based on the client data of the usable execution section; and providing a group data management table and a connection destination setting data table, wherein said group data management table stores the execution-section groups for the execution sections, the terminal groups for said thin client terminals, and the user groups for the users, and said connection destination setting data table stores each of the connectable execution-section groups for at least one of one of the terminal groups and one of the user groups, wherein said determining the chosen one of the connectable execution-section groups comprises:

referring to said client status management table to determine the usable execution section based on the status of each of the execution sections of the chosen execution-section group, wherein the status in the client status management table of the usable execution section is not log on, and said determining connectable client groups comprises:

determining the connectable execution-section groups from said group data management table and said connection destination setting data table based on at least one of the specific user identifier and the specific terminal data;

transmitting the connectable execution-section groups to said specific thin client terminal; and determining the chosen execution-section group through a selection by said specific user.

10. The computer-readable storage medium according to claim 9, wherein said connection control method further comprises:

updating said client status management table based on the status change data indicating a change of the status of each of the execution sections of said thin client servers to said connection control server.

11. The computer-readable storage medium according to claim 9, wherein said connection control method further comprises:

booting up the usable execution section based on the client data of the usable execution section; and transmitting the client data of the usable execution section to said specific thin client terminal such that said specific thin client terminal is connected with the usable execution section.

12. The computer-readable storage medium according to claim 9, wherein said connection control method further comprises: rebooting up the usable execution section based on the client data of the usable execution section; and transmitting the client data of the usable execution section to said specific thin client terminal such that said specific thin client terminal is connected with the usable execution section.

* * * * *